May 17, 1938.　　　　H. BECKER　　　　2,117,694
SHUTTER MECHANISM FOR MOVING PICTURE CAMERAS
Filed May 29, 1936　　　2 Sheets-Sheet 1

Helmut Becker
INVENTOR

BY
ATTORNEY

May 17, 1938.　　　　H. BECKER　　　　2,117,694
SHUTTER MECHANISM FOR MOVING PICTURE CAMERAS
Filed May 29, 1936　　　2 Sheets-Sheet 2

Helmut Becker
INVENTOR

BY Ivan E. A. Kinigsberg
ATTORNEY

Patented May 17, 1938

2,117,694

UNITED STATES PATENT OFFICE 2,117,694

SHUTTER MECHANISM FOR MOVING PICTURE CAMERAS

Helmut Becker, Wetzlar, Germany, assignor to Ernst Leitz, G. m. b. H., Wetzlar, Germany Application May 29, 1936, Serial No. 82,451
In Germany June 3, 1935

8 Claims. (Cl. 88—16)

The object of this invention is to provide a novel and improved shutter mechanism for moving picture cameras for automatically operating the shutter and the film conveying means in order to make overlapping dissolving pictures or fade-ins and fade-outs as they are sometimes called. One object of the invention is to provide means for automatically closing the shutter, reversing the film while the shutter is closed and again opening the shutter and start the film in its normal operation whereby the entire operation of taking overlapping pictures may be carried out wholly automatically and without requiring any special attention except a momentary operation of a suitable coupling member for coupling the shutter mechanism to the film operating mechanism. This mechanism is usable in connection with motor driven film operating means. Another object of the invention is to include in the above mechanism suitable means, operable from the same coupling member, whereby the shutter may be automatically closed and opened also in cameras in which the film is manually operated. Another object of the invention is to provide means for varying the closed period of the shutter to control the length of the film which is to be used for overlapping pictures.

With the foregoing and other objects in view, the invention is embodied in a camera mechanism arranged and constructed as hereinafter set forth, and as illustrated in the accompanying drawings in which Fig. 1 is a side view illustrating the film operating means and the coupling member for reversing the same while the shutter is closed, and also shows parts of the shutter operating mechanism.

Figure 1:
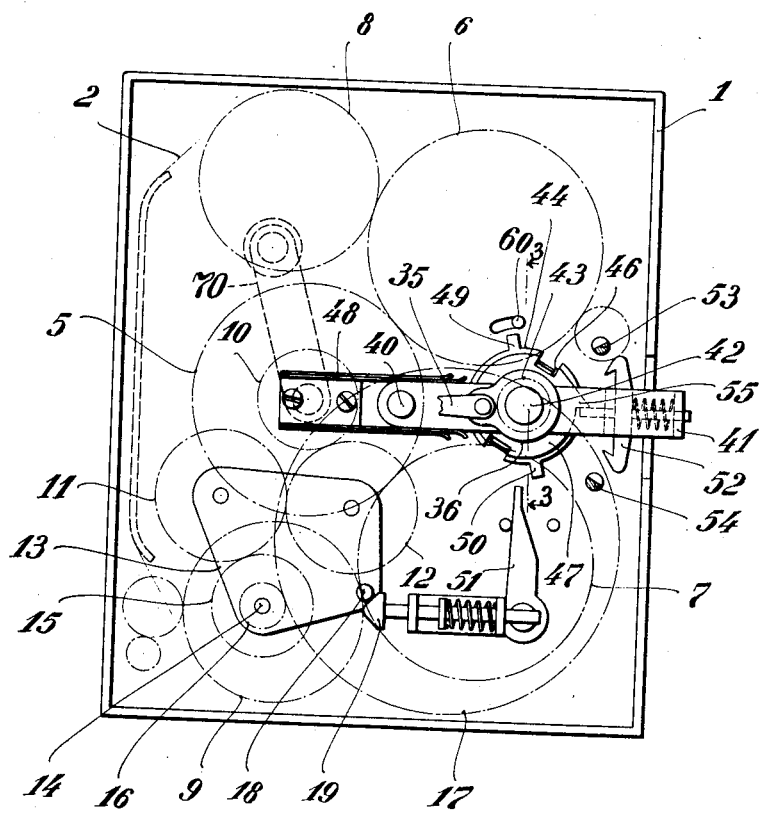

The camera is designated by the reference numeral 1. 2 is the film and 3, 4 the shutter. The film is driven past the shutter by a train of gears including a middle gear 5 which drives gears 6 and 7. These in turn drive gears 8 and 9 which move the film in the usual manner. The gear 5 carries a pinion 10 which is driven from either of the gears 11 and 12 mounted upon a movable carrier 13 pivoted at 14. The gears 11 and 12 are in constant mesh. The gear 11 is driven from a gear 15 which carries a small pinion 16. The latter is driven from a spring motor 17 in the usual manner.

As shown in the drawings the two film driving gears 8 and 9 rotate in anticlockwise direction to advance the film and the middle gear pinion 10 is in mesh with gear 12. The carrier 13 is provided with a pin 18 which is engaged by a bolt 19 which tips the carrier upwards to the left on the pivot 14 and whereby the gear 12 is kept in mesh with the pinion 10. When the bolt 19 is withdrawn slightly to the right, the carrier 13 tips slightly downwardly to the right. The gear 12 is then moved away from the pinion 10 and the latter is engaged by the gear 11 as is obvious. The rotation of the film moving gears 8 and 9 is then reversed.

Figure 2:
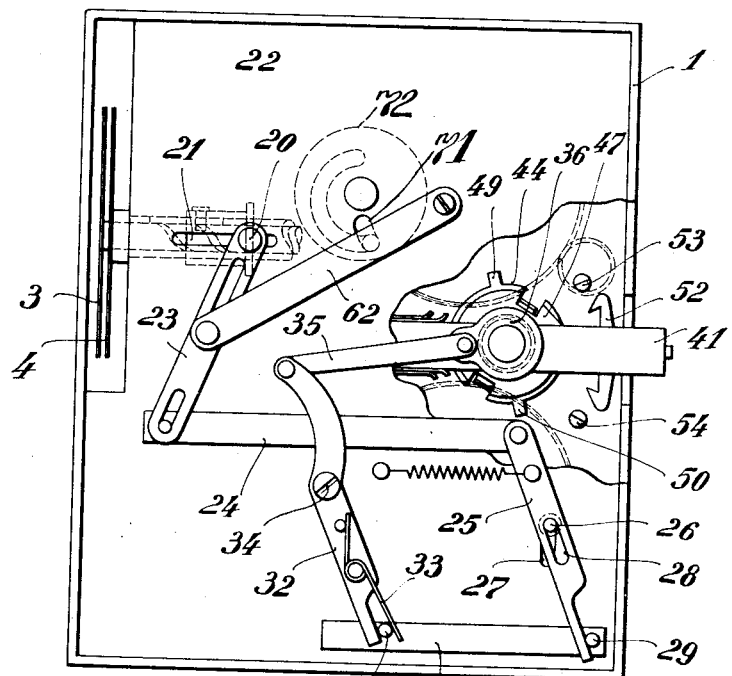
Fig. 2 is a side view of the shutter operating members.

Referring now to Figure 2, the shutter 3—4 is closed and opened in the usual manner by a pin 20 which slides in a slot 21 in the wall 22 which separates the film chamber from the operating mechanisms. The pin 20 is carried by an arm 23 which is pivotally connected to a link 24. The latter is in turn pivotally connected to the upper end of a lever 25 which has a pivot 26. The pivot may be adjusted in a fixed slot 27 and in a slot 28 in the lever. The lower end of the lever 25 is adapted to be engaged by a pin 29 on a slide 30 which carries a second pin 31. The latter is engaged in a fork formed by the lower end of a lever 32 and a spring 33 fixed to said lever. The latter is pivoted at 34 and connected at its upper end to a link 35 pivoted to a crank disk 36.

When the parts are in the position shown in Figure 2, the shutter 3—4 is operated in the usual manner. When the crank disk is rotated 180° from the position shown, the shutter is closed through the operation of the levers and links just described and as will be explained later on.

In accordance with the invention there is provided a coupling member which, when thrown in by the operator, automatically causes a reversal of the film operating gears, closes the shutter, reverses the film, again opens the shutter and again operates the gears to drive the film forward.

Figure 3:
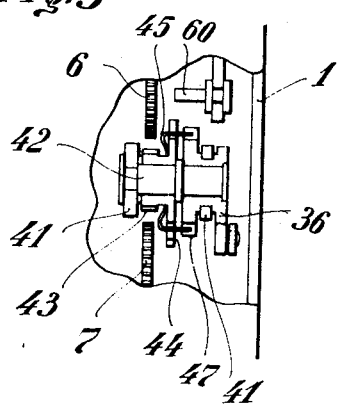
Fig. 3 is a partial sectional view on line 3—3 of Figure 1.
Figure 4:
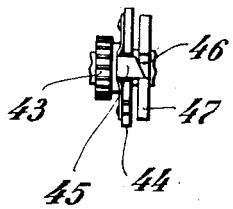
Fig. 4 is a detail view of parts shown in Fig. 3.

The coupling member is in the form of a forked member pivoted at 40 and having two branches 41, 41, see Figures 1, 3, and 4. Fixed springs 48 tend to keep the fork 41 in normal inoperative neutral position between the gears 6 and 7. The free ends of the fork members 41 support a shaft 42, see Figure 3. Upon the latter is mounted, between the fork members, a coupling pinion 43 rigidly connected to a disk 44. The latter carries a diagonally disposed spring 45 adapted to engage in slots 46 in a second disk 47 which in turn rotates with the crank disk 36. The disk 44 has two fingers 49 and 50. Either of these fingers is adapted to engage an arm 51 for shifting the bolt 19 to tip the gear carrier 13. The coupling member 41 is adapted to be moved into two different actuating positions in which the coupling pinion 43 may engage either the lower or the upper gear 7 and 6 as will be explained. In either of its two actuating positions the fork will be held by a yoke 52 adapted to engage either of the two fixed pins 53 and 54.

The operation is as follows:—Assuming that the film is motor driven from the spring motor 17. When it is desired to take overlapping pictures, the operator depresses the fork 41 and thereby throws in the coupling members whereby the operation of the train of gears and the shutter mechanism is coupled. The fork 41 is then locked in depressed position by the yoke 52 engaging the pin 54. When the fork is depressed, the large gear 7 engages the coupling pinion 43 and rotates it anticlockwise. Consequently the crank disk 36 is rotated anticlockwise to actuate the lever 32, see Figure 2, to move the slide 30 leftward. The pin 29 then moves the other lever 25 which in turn operates the link 24 to throw the lever 23. Thus pin 20 is operated to close the shutter. The disk 44 moves with the coupling pinion 43 and when the shaft 42 has been rotated 180° anticlockwise, the finger 49 engages arm 51 to withdraw the bolt 19 from the pin 18. Thus the gear carrier 13 tips rightwardly, the gear 12 is disengaged from the pinion 10 and the latter is engaged by the gear 11 as is obvious. Hence the train of gears is reversed and the film runs reversed with closed shutter.

Inasmuch as all the gears are reversed, the coupling pinion 43 is also reversed and therefore at the end of the said first rotation of 180° this pinion now commences to rotate clockwise and the spring 45 by reason of its bevelled ends, see Figure 4, is turned out of engagement with the disk 47. The latter and the crank disk 36 therefore remain stationary and the shutter remains closed while the film is reversed. However, as soon as the pinion 43 has completed the said second 180° movement this time in clockwise direction, the other finger 50 on the disk 44 engages the arm 51 and the bolt 19 is moved to the left in under the pin 18. The gear carrier is now tipped upwardly to the left so that the gear 12 again engages the pinion 10 and the train of gears are now again driven forwardly to advance the film. Consequently the coupling pinion 43 is now again rotated in anticlockwise direction and as it commences this movement, the spring 45 engages the disk 47 and moves the latter and the crank disk 36 anticlockwise back into the starting position shown in Figure 1 and the shutter is opened. At the end of this movement, which is 180°, a nose 55 on the disk 47 engages the yoke 52 to release the latter from the pin 54 whereupon the coupling member 41 is moved back into neutral inoperative position and the operation is finished.

If the film is manually driven or operated, then the operation of taking overlapping pictures is as follows:—The operator raises the coupling member 41 which then is locked in its upper operative position by engagement between the yoke 52 and the pin 53. Thus coupling pinion 43 engages the gear 6 and the shaft 42 is again operated anticlockwise to close the shutter 3—4. After a movement of 180°, the finger 50 engages a pin 60 which serves as a notice to the operator to reverse the film by moving the operating handle 70 backwards. The shaft 42 is now again rotated for 180° in clockwise direction until the finger 49 engages the pin 60 as an indication to the operator to cease reversing the film and commence to advance it. Thus shaft 42 is again rotated anticlockwise and the crank disc is brought back into normal position as in Figure 1 and the shutter is opened. At the end of the movement the yoke 52 is disengaged from pin 53 by the nose 55 on the disk 47.

The operations may be summarized as follows:—If the film is motor driven, the coupling member 41 is moved down. If the film is manually driven, the coupling member is moved up. In both cases, the coupling shaft 42 is operated to actuate the shutter actuating members shown in Figure 2 to close and thereafter open the shutter. If the film is motor driven, the gearing is automatically reversed while the shutter is closed and at the end of the overlapping movement the film is again advanced, the entire operation being automatic. If the film is manually driven, the coupling member operates to indicate when the film is to be reversed and at the end of the overlapping movement it also indicates that the film is again to be advanced.

The mechanism illustrated in Figure 2 includes a hand operated arm 62 for closing and opening the shutter by hand. The arm 62 has a pin and slot connection 71 with a disk 72 which is operated by the operator.

The length of the film upon which the overlapping pictures are to be taken is determined by the operations of the two fingers 49 and 50 which accomplish the gear reversing movements and determine the period of time during which the shutter is closed. However, the lever mechanism which is actuated from the crank disk 36 includes means for varying the closed period of the shutter, hence the length of film which is used for the overlapping pictures. If the pivot 26 is moved into another position, for instance moved to the bottom of the slot 27, the lever 25 will be thrown to the left away from the pin 29. When now the coupling fork 40 is operated, a certain length of film runs without the shutter being closed because the shutter closing lever 25 will not be engaged immediately by the slide pin 29. That is the pin 29 and slide 30 will move idly a short distance to the left in Figure 2. When pin 29 reaches lever 25 the latter will be moved to close the shutter. This happens before the crank disk has completed its 180° anticlockwise movement. Consequently the lever 32 will continue to be moved by the crank 36 after the slide 30 has completed its leftward movement. The continuing idle movement of the lever 32 is made possible by the spring 33 which gives and slides around the pin 31 as will be understood. When the reverse movement of the film has been accomplished, the coupling fork is automatically moved up. The gearing now advances and the lever 32 begins at once to travel to the right but does not immediately cause the return movement of the slide 30 until the latter has moved idly as far back to the right as it was moved idly to the left at the beginning of the movement. The spring 33 again acts to take up or compensate for the difference in movements between the slide pin 31 and the lower end of the lever 32.

It follows that the mechanism for causing reversal of the film always works upon the same length of film, but that within this length the length of the overlapping operation itself may be varied by adjusting the pin 26.

I claim:—

1. In a motion picture film camera an apparatus for producing overlapping exposures comprising in combination a shutter, operating means to open and close the shutter, film advancing means, a device for reversing the film advancing means, a normally inactive coupling mechanism for automatically and sequentially operatively connecting the shutter operating means with the film advancing means to close and open the shutter and for connecting the said reversing device with the film advancing means to reverse the film while the shutter is closed, and advance the film when the shutter is again opened, a manually operated member for moving said coupling mechanism into operative position and a member in said coupling mechanism and actuated by the said film advancing means for automatically moving said coupling mechanism into inoperative position.

2. In a motion picture film camera an apparatus for producing overlapping exposures comprising in combination a shutter and means to open and close the same, film driving gears, a coupling mechanism for automatically connecting the film driving gears with the shutter closing means to close the shutter, means for operating said driving gears to reverse the film while the shutter is closed and for operating said gears to advance the film when the shutter is opened and means indicating the beginning and the end of the reverse movement of the film.

3. In a motion picture film camera an apparatus for producing overlapping exposures comprising in combination film advancing gears, a shutter and means to open and close the same, a gear reversing device, a coupling mechanism for actuating said shutter operating means and gear reversing device whereby first to close the shutter, then to connect the reversing device with the film advancing gears to reverse the film while the shutter is closed and thereafter to restore the advancing gears to normal operation and actuate the shutter operating means to open the shutter, means for maintaining said coupling mechanism in normally inactive position, manually operated means for putting said coupling mechanism in operation, means for locking said mechanism in operative position and means included in said coupling mechanism for automatically releasing it from the said locking means.

4. In a motion picture film camera an apparatus for producing overlapping exposures comprising in combination a shutter and means to open and close the same, film advancing gears, a coupling mechanism for automatically connecting the film advancing gears to the shutter operating means to close the shutter, an operating handle for reversing the said advancing gears to reverse the film while the shutter is closed and for operating said gears to advance the film when the shutter is opened and means indicating to the operator the beginning and the end of the reverse movement of the film.

5. In a motion picture film camera, an apparatus for producing overlapping exposures comprising in combination film advancing means, a device for reversing the movement of said advancing means, a shutter, operating means to open and close the same, a mechanism for operatively connecting the shutter operating means to the film advancing means to close the shutter and for operatively connecting the said reversing device to the said advancing means to reverse the film while the shutter is closed and means in said shutter operating means for varying the lenth of film operated upon during the said reverse movement.

6. In a motion picture film camera an apparatus for producing overlapping exposures including a shutter, means to open and close the shutter, a plurality of intermeshing gears including a reversing gear for moving the film with relation to the shutter, a gravity actuated gear carrier supporting said reversing gear, an abutment engaging the gear carrier to support the reversing gear in non-reversing position while the film is being advanced, an abutment operating member for disengaging the abutment from the gear carrier to cause the latter to move by gravity to place the reversing gear in position to reverse the movement of the film whereby to produce overlapping exposures, means for actuating said abutment operating member, springs normally holding said operating means inactive and a manually operated member for moving the said operating means into operative engagement with the said abutment operating member.

7. In a motion picture film camera an apparatus for producing overlapping exposures including a shutter, gears for normally advancing the film with relation to the shutter, means for reversing the movement of said gears to reverse the advancing movement of the film, interconnected levers for closing the shutter while the film is reversed, a coupling mechanism for operating said levers, said mechanism including a coupling shaft, a disk on said shaft connected to the said levers to operate the same, a pinion on said shaft to drive the same to actuate said disk, means normally holding said mechanism inactive and a manually operated member for moving said mechanism to position the said coupling gear in operative driving connection with the aforesaid gears to rotate the coupling shaft.

8. A device according to claim 7 including means for adjusting the operations of the interconnected levers to delay the closing of the shutter after the said coupling mechanism has been moved into position to operatively connect the levers operating disk to the gears.

HELMUT BECKER.